United States Patent Office 3,375,799
Patented Apr. 2, 1968

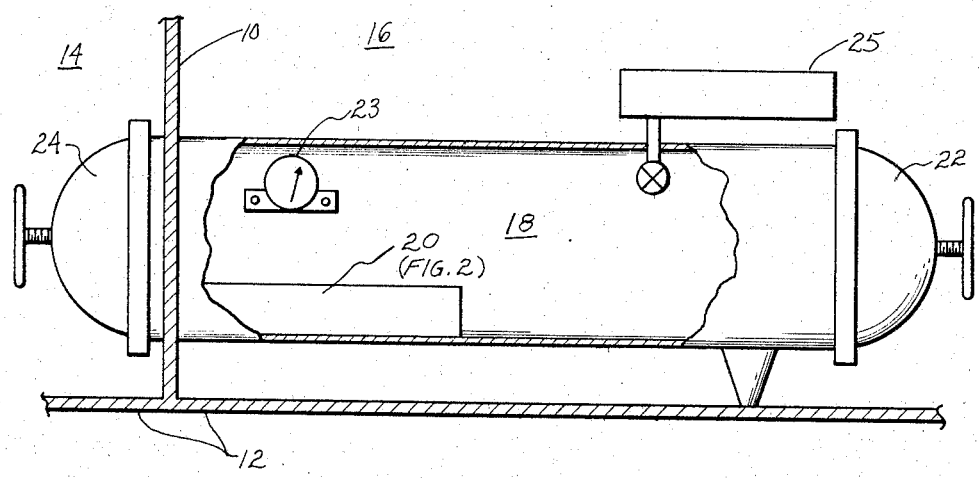
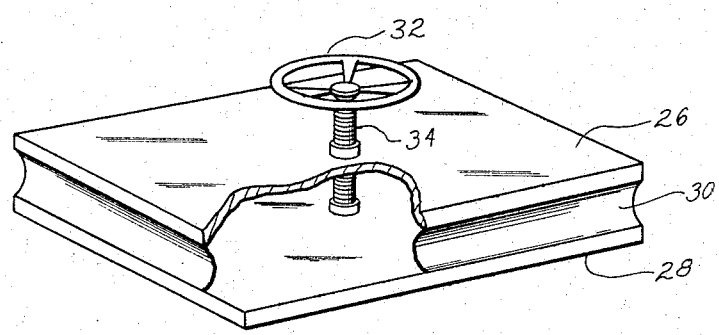
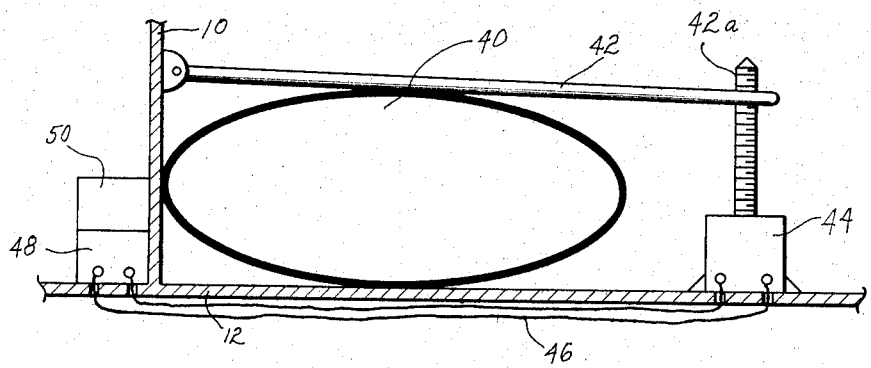

3,375,799
LIQUID PRESSURE ACCOMMODATION MEANS
Jacob J. Miller, 48 Kimberly Road,
West Hartford, Conn. 06107
Filed Mar. 3, 1966, Ser. No. 531,579
3 Claims. (Cl. 114—16.6)

ABSTRACT OF THE DISCLOSURE

The pressure of a liquid in a pressure-tight vessel is altered by forcibly adjusting the volume of the pressure-tight vessel, without adding or removing any liquid from the vessel. Small power, including human, is used to permit changing from one environment to another where the environments have widely diverging pressures, by means of an intermediate environment including the volume changing capability of the present invention.

BACKGROUND OF THE INVENTION

Field of invention

This invention relates to hydraulics, and more particularly to a method and exemplary apparatus for accommodation of differentials in liquid pressure.

Description of the prior art

In a variety of scientific and exploratory endeavors currently in practice, there are numerous instances where a plurality of related environments exist at highly different fluid pressures. As an example, consider underwater exploration and military operations. It is well known that the problems of entering and leaving an underwater vessel become increasingly more difficult as the environmental depth of the vessel increases. For instance, permitting escape of personnel from a distressed submarine requires the usage of pressure isolation chambers so as to permit escape without creating catastrophic conditions as an incidence thereto. Similarly, entrance and egress to and from an underwater exploratory vessel or station requires some form of intermediate buffering system to permit such operations safely.

In prior systems of this type, an essential characteristic of the devices or systems used is the availability of a suitably effective source of power. The power actually employed may be hydraulic, pneumatic or electric, but is dependent upon at least one primary source of suitable power. However, when a vessel is in distress, the availability of power in order to effect escape operations cannot be relied upon. Similarly, in exploratory vessels and stations used in non-military operations, it is frequently necessary to completely isolate the vessel or station from the ocean's surface due to the complexity of handling cables and other connections capable of remaining effective at depth of thousands of feet. For instance, the weight of a connecting cable at a depth of 2,000 feet may be so great that it is extremely difficult to provide a suitably disposed winch on a surface craft, for manipulating the cable.

SUMMARY OF INVENTION

A primary object of the invention is to provide improved apparatus for accommodating differentials of pressure in a fluid environment, including any combination of liquid and gaseous environments.

Other objects of the invention include:

Provision of fluid pressure accommodation apparatus capable of operating without primary sources of considerable power or energy;

Provision of such an apparatus capable of operating in response to small or portable power sources or in response to human power;

Provision of apparatus for accommodating transfer of a person from a first environment having a given pressure relative to atmospheric pressure to a second environment having a relative pressure which differs greatly from that of said first environment;

Provision of apparatus for permitting the transfer of a person from a gaseous environment to a liquid environment wherein the liquid environment is at a pressure which is much higher than that of said gaseous environment.

This invention is predicated on the concept that although a large amount of power (that is, the ability to perform a relatively high amount of work in a relatively small amount of time) is necessary in order to breach the separation between chambers of highly divergent pressure, if the pressure of an intermediate chamber is first allowed to equal that of the first environment, and this pressure is then adjusted to equal that of a second environment, then no greatly diverging pressures are apparent at any time that physical communication is made between the intermediate chamber and either of the environments.

In accordance with the present invention, an intermediate chamber is provided between an environment having relatively low pressure and an environment having a relatively high pressure. A person (for instance) desirous of passing between one environment and the other will enter the chamber and therefore cause the chamber to assume the pressure of the environment from which he is entering. Once within the chamber, which is then isolated with respect to both environments, the pressure within the chamber may be either increased or decreased as necessary in order to adjust the pressure to that of the environment to which he is passing.

The invention is further predicated on the concept that the pressure and volume of liquids are so related, by the natural laws of physics, that a small change in volume of the liquid will be accompanied by a much greater change in pressure of the liquid; stated alternatively, great changes in pressure imposed upon the liquid cause relatively small changes in the volume disposed by the liquid and, therefore, effecting a minute change in the volume which is disposed by a liquid will necessarily cause the pressure of the liquid to change markedly.

In further accord with the present invention, the change in pressure necessary to adjust the intermediate environment from that of a first (or entrance) environment to that of a second (or exit) environment, is accomplished by forcibly altering the volume in which liquid of the intermediate environment is disposed. When physical communication is to be made between a gaseous environment and another environment, fluid may be admitted to the intermediate environment for the purpose of allowing a volumetric change to effect a change in fluid pressure. This being so, the apparatus and method in accordance with this aspect of the invention may be readily utilized to accommodate differentials in gaseous as well as liquid pressures, so long as liquid is available to utilize volume as a control over pressure within the intermediate, or buffering environment.

Although the invention is described in terms of an intermediate chamber which is utilized to permit ready communication of a physical sense between two environments of widely divergent fluid pressures, and although the exemplary embodiment disclosed herein takes the form of an entrance and exit, or escape apparatus for underwater vessels, the principle of the invention may take a variety of other forms and may be implemented in different environments so as to achieve other, similar utilizations.

The invention permits the utilization of relatively small power sources to effect transfer or other physical communication, between pressure environments which heretofore have required the expenditure of large amounts of power which require the availability of substantial primary power sources, and which preclude the utilization of portable or human power for the operation thereof.

Other objects, features and advantages of the present invention will become more apparent in the light of the following detailed description of a preferred embodiment thereof as shown in the accompanying drawing.

BRIEF DESCRIPTION OF THE DRAWING

FIGURE 1 is a partially broken away, partially sectioned elevation of an exemplary intermediate chamber disposed for communication between environments of different pressures which take the form of a lower-pressure chamber and a higher-pressure chamber, separated by an isolating wall;

FIGURE 2a is a simplified perspective, partially broken away, of an elementary volume control device suitable for use in the apparatus of FIGURE 1; and FIGURE 2b is a partially sectioned elevation of an alternative volume control device utilizing a resilient spheroid which is operable by electric means to be made more or less oblate or obtuse.

DESCRIPTION OF THE PREFERRED EMBODIMENT

For simplicity in presenting an exemplary embodiment of the present invention, a detailed description of the application of the invention to a vessel having two chambers within which divergent pressures may exist is shown in a brief fashion in FIGURE 1, wherein a chamber wall 10 and deck structure 12 define the intersection of a pair of chambers 14, 16, one of which is at relatively low pressure (such as atmospheric pressure) and has a life-sustaining atmosphere therein, and the other of which has a relatively high pressure such as would be obtained in an entrance chamber to an undersea vessel or station, or as might occur within one chamber of a vessel which had become flooded through a breach in its outer walls. Disposed for communication with both chambers is an intermediate chamber 18 which is shown partially broken away in FIGURE 1 to illustrate the presence therein of a volume control device 20, variations of which are shown in FIGURE 2. Entrance to the chamber may be gained from either end by means of oppositely-disposed hatches 22, 24 each of which is capable of providing watertight integrity at the pressures which may be encountered in the utilization of the device. The intermediate chamber 18 may contain a pressure gauge 23 so as to advise a person utilizing the chamber of the pressure which exists therein relative to atmospheric pressure during his use of the device. A source of liquid 25 may be utilized to provide a liquid environment within the chamber 18 so as to permit volume-controlled fluid pressure adjustment even when the chamber 18 is entered from a gaseous environment.

As an example, consider that the high pressure chamber 16 represents an entranceway into an underwater station or vessel such as a bathyscope, bathysphere or submarine, and a low pressure chamber 14 represents a compartment within the vessel or station wherein suitable atmosphere is provided to sustain life without the need for persons therein to wear artificial atmospheric devices. In order to pass from the high pressure chamber 16 (which we will assume to be full of water) to the lower pressure chamber 14 (which we will assume to have a suitable gaseous atmosphere) the operator would open the hatch 22 and enter the chamber and thereafter secure the hatch 22 so as to provide environmental integrity between the high pressure chamber 16 and the intermediate chamber 18. The operator would then operate the volume control device 20 so as to increase the volume in which the fluid within the chamber 18 is disposed, and as a result of increasing the volume of the chamber 18 (by decreasing the volume of the control device 20) he would thereby effect a great reduction in the pressure (which could be monitored on the pressure gauge 23). When a suitable pressure has been reached, the operator could then open the hatch 24 so as to gain access to the low-pressure chamber 14. Of course, water (or other liquid) within the chamber 18 would spill into the chamber 14, but this would be a relatively small amount of liquid which could be accommodated in any well known fashion.

In a similar fashion, an operator may enter the intermediate chamber 18 from the low pressure chamber 14 through the hatch 24, and thereafter secure the hatch 24 so as to isolate the intermediate chamber 18. In the example, the chamber 14 is full of air, which cannot undergo a large pressure change as a result of a small volume change. Therefore, the operator would fill the chamber with water (or other liquid) from the liquid source 25. Then the operator could increase the volume of the volume control device 20, thereby decreasing the amount of volume in which the liquid within the intermediate chamber 18 is disposed. This would cause a very high increase in pressure of the liquid within the intermediate chamber 18; by watching the pressure gauge 23, the operator can tell when the pressure inside the intermediate chamber 18 is approximately equal to the pressure in the high pressure chamber 16 and can then open the hatch 22 so as to have access to the high pressure chamber.

A very simple and rudimentary example of a volume control device which is capable of operating without a great deal of power is illustrated in FIGURE 2a. Therein, the volume control device 20 is shown to comprise an upper plate 26 disposed in parallel relationship with a lower plate 28, a chamber being formed between the plates by a suitable diaphragm 30. The diaphragm 30 would be fused or fastened to the upper and lower plates in a manner so as to provide environmental integrity within the intermediate chamber having a relatively low pressure inside the chamber formed by the plates and the diaphragm 26–30. In order to lower the pressure within the intermediate chamber 18, the volume of the device shown in FIGURE 2a would be decreased by turning a handle 32 which is operative to rotate a lead screw 34 so as to move the upper plate 26 closer to the lower plate 28. The pitch on the lead screw 34 would be made extremely fine so as to permit a very high mechanical advantage by the operator (which is required in order to overcome the high forces acting upon the threads of the lead screw). However, it should be appreciated that the upper plate may be moved microscopically with respect to the movement of the wheel 32, by means of suitable mechanical gear reduction, if required, and that a certain amount of time may be utilized by an operator in order to effect the desired small amount of motion of the upper plate 26 relative to the lower plate 28 so as to effect a very small change in the volume of the intermediate chamber 18.

The foregoing contrasts with the need to completely open or completely close one of the hatches 22, 24 against greatly differing pressures; in such case, it is impossible to open the hatches a little at a time: once there is a breach in the integrity of the intermediate chamber 18, the breach is absolute and complete, and therefore the differential in the pressure between the high pressure chamber 16 (for instance), and the intermediate chamber 18 must be accounted for in a solitary operation of the hatch 22. It is this aspect of the apparatus herein which relates to the gist of the invention: avoiding the necessity of operating at highly different pressures by utilizing a small volume change to greatly alter the pressure of an intermediate or buffing chamber prior to causing communication between that chamber and a chamber which has initially had a highly different pressure.

An alternative form of the elementary volume control device 20 is shown in FIGURE 2b. Therein, a spheroid 40 which may be made of a resilient metal or other suitable material is axed to the structures 10, 12 and is shown partially compressed by an arm 42 which is relatively movable so as to increase or decrease the compression force on the spheroid 40 by means of a lead screw 44 which is operated by an electric motor having a suitable gear reduction so as to provide relatively small motion of the arm 42 with the expenditure of a relatively small amount of power. The motor 44 may be operated remotely by electricity supplied to it over a pair of lines 46 from a switch or other suitable device 48 which may control the power of a small source of energy such as battery 50. As shown in FIGURE 2b, this permits operating of the volume control device 20 by means external to the intermediate chamber 18, such as might be necessary in the case where frogmen are placing an injured diver into the intermediate chamber so as to permit him to be withdrawn into the atmosphere of the low pressure chamber 14, the injury preventing the diver from operating the device himself. FIGURE 2b also illustrates the possibility of operating the volume control device by means of a small battery 50 (or other suitable small, portable power source) rather than using human power; it should be borne in mind that one of the objectives of the invention is to permit use of relatively small sources of power to achieve the communication between environments of highly different pressure, thereby avoiding the necessity of having suitable primary sources of large amounts of power available in either damaged or isolated vessels.

For simplicity, other means of changing the volume of the intermediate chamber 18 have not been shown in the drawing, but they should be apparent to those skilled in the art. For instance, a series of peripherably operable forces might be provided so as to directly alter the shape of the intermediate chamber in such a fashion as to increase or decrease its total volume, rather than using the volume control device 20 to alter the effective volume of the liquid within the chamber as is achieved with the devices of FIGURE 2. Also, it is possible to alter the structure of the hatches 22, 24, so that once integrity is achieved thereby (the shape thereof could be altered so as to increase or decrease the total volume of the intermediate chamber 18. Similarly, other distortions of the intermediate chamber 18 could be provided. It is important to note that the amount of volumetric change required to effect a great pressure change is relatively small for a liquid.

It should be apparent to those skilled in the art that the materials to be used in the formulation of an intermediate chamber with suitable volume controlling apparatus, and the detailed nature of any volume control device (such as the volume control device 20 illustrated in FIGURE 2) is not germane to the present invention. Different utilizations and environments may call for different materials more suited therefor. Additionally, the particular structure involved is not pertinent, there being a large number of variations in the shape, form and other details of the devices illustrated herein.

While the invention has been shown and described with respect to preferred embodiments thereof, it should be obvious to those skilled in the art that the foregoing and other changes and omissions in the form and details thereof may be made therein without departing from the spirit and scope of the invention, which is to be limited only as set forth in the following claims.

I claim:

1. Apparatus for permitting physical communication between a pair of environments having widely divergent fluid pressures, comprising:
    an intermediate chamber disposed for communication with each of said environments, said chamber including means to effect fluid isolation of said chamber, selectively, from each of said environments, independently, said chamber adapted to receive a liquid; and pressure means for altering the pressure of said liquid in said chamber, without altering the mass of fluid in said chamber, said pressure means comprising means for forcibly altering the volume displaced by said liquid, whereby the pressure of said liquid is altered in an inverse manner.

2. The invention described in claim 1 wherein at least a first one of said environments is liquidus in nature, and wherein said chamber is opened to said first environment prior to operation of said pressure means.

3. The invention described in claim 1 including means to introduce a liquid into said intermediate chamber.

References Cited

UNITED STATES PATENTS

| | | | |
|---|---|---|---|
| 726,085 | 4/1903 | Morrell | 114—16.6 |
| 1,864,471 | 6/1932 | Rademacher | 114—16.6 |

FOREIGN PATENTS

Ad. 6,163    1886    Great Britain.

MILTON BUCHLER, *Primary Examiner.*

T. M. BLIX, *Assistant Examiner.*